US010482492B2

(12) United States Patent
Khvostov et al.

(10) Patent No.: US 10,482,492 B2
(45) Date of Patent: Nov. 19, 2019

(54) METHOD AND SYSTEM FOR PLATFORM ATTRIBUTION USING DIGITIZED TOKENS

(71) Applicant: MasterCard International Incorporated, Purchase, NY (US)

(72) Inventors: Eugene Khvostov, Cliffside Park, NJ (US); Shoshana Rosenfield, Rye, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 773 days.

(21) Appl. No.: 15/132,425

(22) Filed: Apr. 19, 2016

(65) Prior Publication Data
US 2017/0300961 A1    Oct. 19, 2017

(51) Int. Cl.
G06Q 30/00    (2012.01)
G06Q 30/02    (2012.01)

(52) U.S. Cl.
CPC ..... *G06Q 30/0246* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 9,998,978 | B2* | 6/2018 | Youdale | H04W 48/02 |
| 2015/0199679 | A1 | 7/2015 | Palanisamy | |
| 2015/0317674 | A1 | 11/2015 | Ghosh | |

(Continued)

FOREIGN PATENT DOCUMENTS

JP    2011182972 A  *  9/2011  ............... A63F 7/02

OTHER PUBLICATIONS

Ferraiolo et al. Guidelines for Derived Personal Identity Verification (PIV) Credentials. (Dec. 2014) Retrieved online Aug. 3, 2019. https://nvlpubs.nist.gov/nistpubs/SpecialPublications/NIST.SP.800-157.pdf. (Year: 2014).*

(Continued)

*Primary Examiner* — James A Reagan
(74) *Attorney, Agent, or Firm* — Buchanan Ingersoll & Rooney PC

(57) ABSTRACT

A method and system for determining attribution for a computing device, which includes receiving an attribution request, wherein the attribution request includes at least a specific computing device identifier and an indication of an advertisement; identifying a digital token number associated with the specific computing device identifier; identifying a primary account number corresponding to the identified digital token number and one or more alternative digital token numbers also corresponding to the identified digital token number; identifying a transaction data entry related to an electronic transaction, wherein the transaction data entry includes transaction data and one of: the digital token number, the primary account number, and one of the one or more alternative digital token numbers; and electronically transmitting an attribution message to the third party entity, wherein the attribution message includes attribution of the indicated advertisement to the related electronic transaction.

20 Claims, 8 Drawing Sheets

(56) References Cited

U.S. PATENT DOCUMENTS

2015/0348018 A1* 12/2015 Campos .................. G06Q 20/36
                                                                     705/41
2016/0019545 A1    1/2016  Vastenavondt
2017/0262841 A1*  9/2017  Good ................... G06Q 20/385

OTHER PUBLICATIONS

International Search Report and Written opinion issued by the International Search Authority dated Jun. 28, 2017 in corresponding PCT Application No. PCT/US2017/024902 (13 pages).
Office Action dated Feb. 5, 2019, by the U.S. Patent and Trademark Office in co-pending U.S. Appl. No. 15/132,403.

* cited by examiner

US 10,482,492 B2

METHOD AND SYSTEM FOR PLATFORM ATTRIBUTION USING DIGITIZED TOKENS

FIELD

The present disclosure relates to identifying a group of related computing devices via the use of digitized tokens for platform attribution, specifically the identification of computing devices that are associated with digitized tokens that are each associated with a common account such as may be used in the attribution of advertisements and other content to the respective computing devices.

BACKGROUND

As technology increases, the number of computing devices with which the average consumer interacts also increases. In the past, a consumer may have possessed a home desktop computer that they used for all of their Internet browsing and e-commerce needs. In such instances, an advertisement that was displayed to the consumer prior to the consumer making a related purchase might get credit for attribution of the purchase because of the commonality of the identification of the communication device, via browser-based cookies stored in the desktop computer or other known identification mechanisms. However, as technology has increased, the same consumer may now possess multiple computer platforms such as their home desktop computer, as well as a laptop computer, a tablet computer, and a smart phone, for instance, each possibly presenting a different set of communication channels. The consumer may be exposed to an advertisement on each of the platforms before finally making a purchase using one of the platforms or via an in-person payment transaction.

In many systems, the purchase may be attributed to the platform with which the consumer made their purchase. However, such systems may neglect to consider the other platforms used by the consumer on which they were exposed to an advertisement or content related to the purchase. In the case of an in-person transaction, no platform may receive attribution for the purchase as traditional attribution systems and advertising agencies are unable to identify in-person transactions, let alone further identify a computing device used by the consumer prior to the transaction.

Thus, there is a need for a technical solution to enable the attribution of individual purchases to multiple computing devices. Identification of a transaction account associated with a computing device may enable the attribution of a computing device (e.g., that has received a related advertisement) to a purchase. However, in many instances, computing devices may receive digitized tokens for use in payment transactions in place of traditional account credentials. As such, computing devices may be associated with digitized tokens and not directly associated with a transaction account. Thus, many computing systems may be unable to identify a transaction account associated with a computing device, instead being limited to identifying the associated digitized token. Therefore, there is also a need for a technical solution where a system that is configured to manage the use of digitized tokens is further configured to identify related computing devices based on associated digitized tokens and transaction account data for use in platform attribution.

Some methods have been developed for the use of a single identifier that is associated with a transaction account that is different from the transaction account number, which may be used as an identifier for transactions using the real transaction account number as well as any digital tokens associated with that account. For example, some payment card standards suggest the use of a payment account reference (PAR), a unique identifier associated with a transaction account that is stored in an additional data element conveyed any time the real transaction account number or any associated digital token is used. However, the use of an additional reference number in transactions themselves may require modification to all existing points of sale, payment networks, financial institutions, and merchant systems. In addition, while this information may be used during the processing of transactions, it may be unavailable to advertisers and other entities, which may be able to identify that a purchase is made using a device, but may be prohibited from accessing any payment information from that device. Thus, there is a need for a technical solution for enhanced attribution of computing devices that utilizes information identifying the devices themselves, which can be associated together without modification to legacy transaction systems.

SUMMARY

The present disclosure provides a description of systems and methods for identifying a plurality of related computing devices related to a transaction account.

A method for determining attribution for a computing device includes: receiving, by a receiving device of a processing server, an attribution request from a third party entity, wherein the attribution request includes at least a specific computing device identifier and an indication of an advertisement; identifying, by a querying module of the processing server, a digital token number associated with the specific computing device identifier, wherein the association is based on a prior provisioning of the digital token number to a computing device associated with the specific computing device identifier; identifying, by the querying module of the processing server, a primary account number corresponding to the identified digital token number and one or more alternative digital token numbers also corresponding to the identified digital token number; identifying, by the querying module of the processing server, a transaction data entry related to an electronic transaction, wherein the transaction data entry includes transaction data and one of: the digital token number, the primary account number, and one of the one or more alternative digital token numbers; and electronically transmitting, by a transmitting device of the processing server, an attribution message to the third party entity, wherein the attribution message includes attribution of the indicated advertisement to the related electronic transaction.

A system for determining attribution for a computing device includes: a receiving device of a processing server configured to receive an attribution request from a third party entity, wherein the attribution request includes at least a specific computing device identifier and an indication of an advertisement; a querying module of the processing server configured to identify a digital token number associated with the specific computing device identifier, wherein the association is based on a prior provisioning of the digital token number to a computing device associated with the specific computing device identifier, identify a primary account number corresponding to the identified digital token number and one or more alternative digital token numbers also corresponding to the identified digital token number, and identify a transaction data entry related to an electronic transaction, wherein the transaction data entry includes transaction data and one of: the digital token number, the primary account number, and one of the one or more alternative digital token numbers; and a transmitting device of the processing server configured to electronically transmit an attribution message to the third party entity, wherein the attribution message includes attribution of the indicated advertisement to the related electronic transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
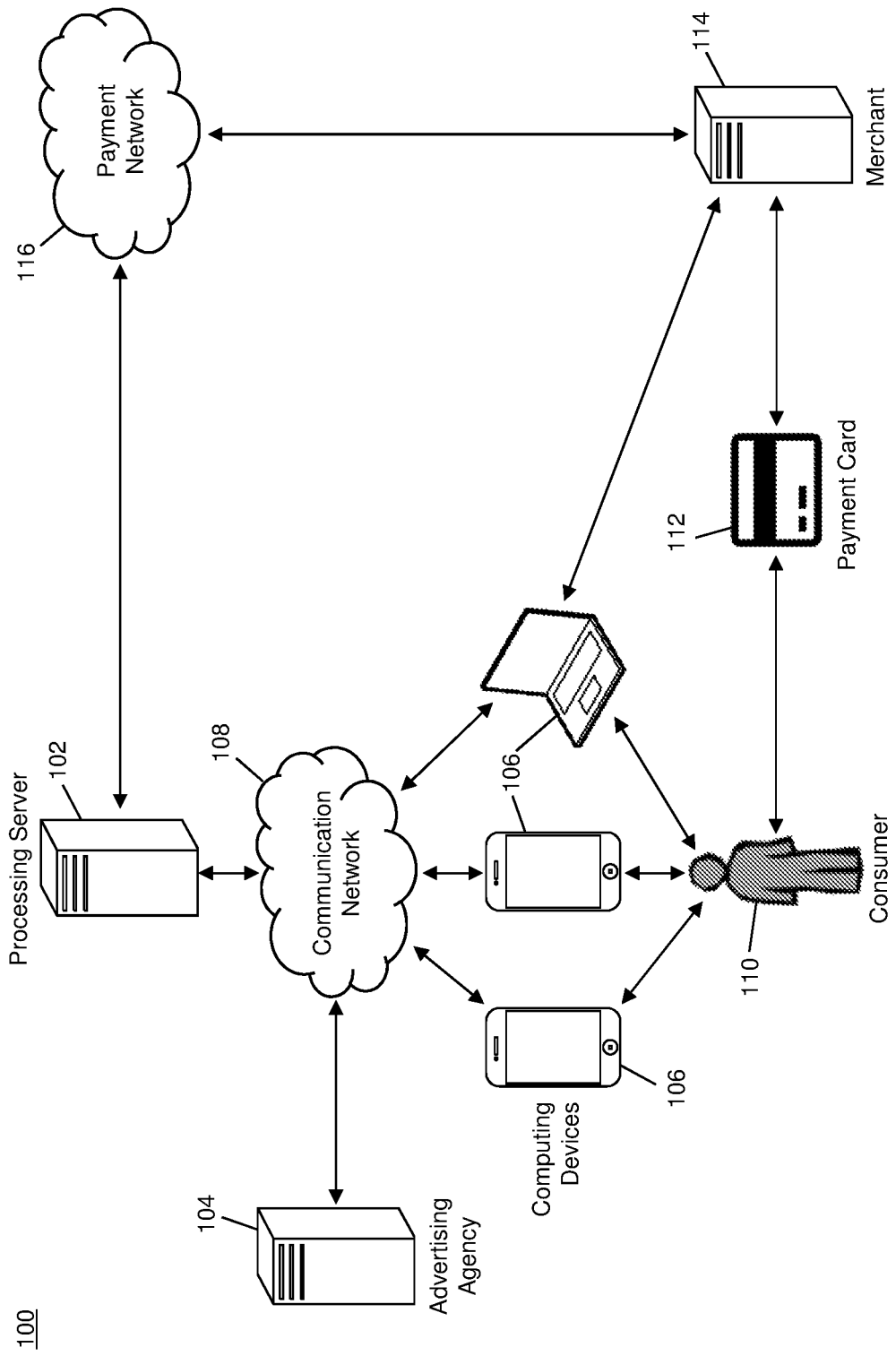
FIG. 1 is a block diagram illustrating a high level system architecture for identifying related computing devices related to a transaction account for platform attribution in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

System for Identification of Related Computing Devices for Platform Attribution

FIG. 1 illustrates a system 100 for the identification of related computing devices that are each related to a transaction account for use in platform attribution of advertisements and other content.

Figure 2:
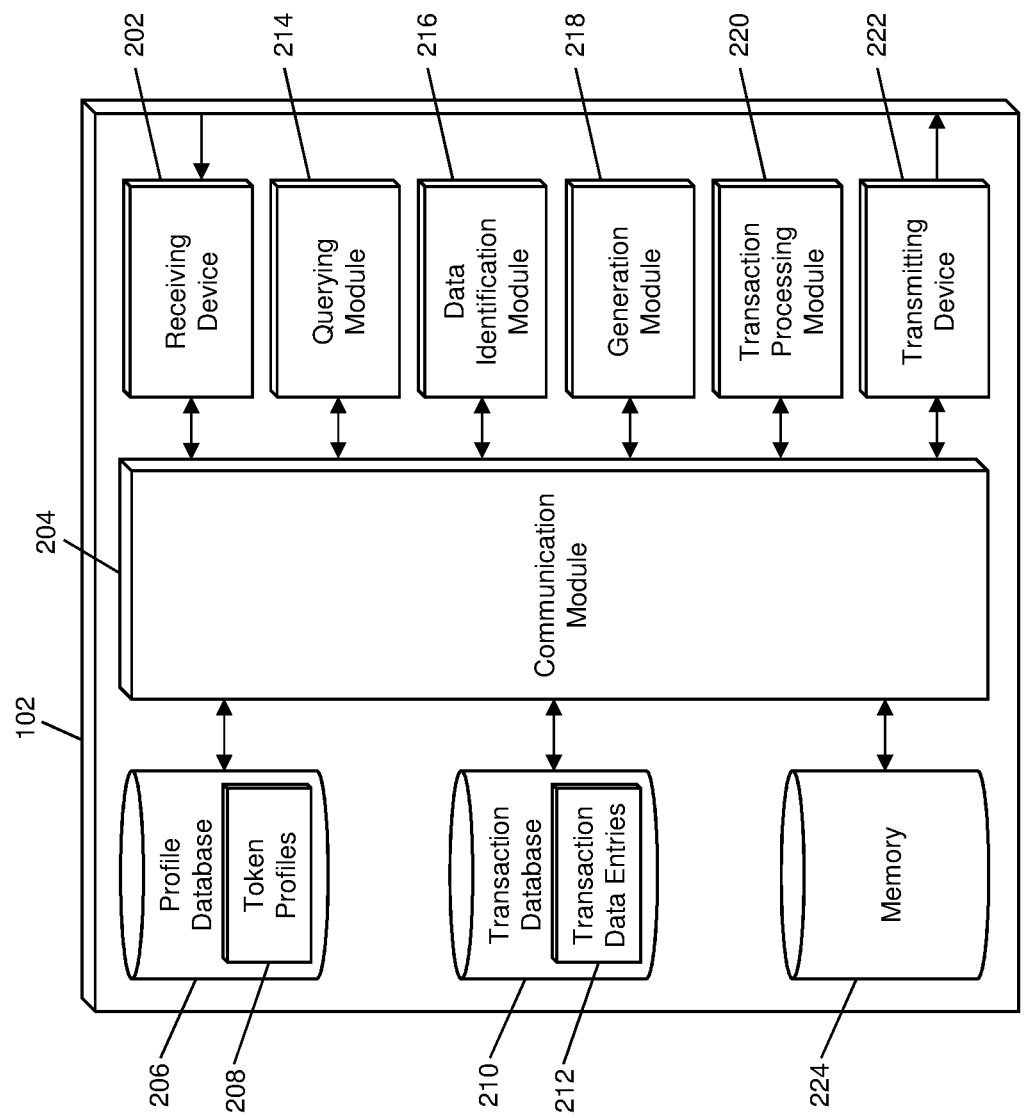
FIG. 2 is a block diagram illustrating the processing server of FIG. 1 for the identification of related computing devices in accordance with exemplary embodiments.

The system 100 may include a processing server 102. The processing server 102, discussed in more detail below, may be configured to identify a plurality of computing devices that are each related to a single transaction account and the identification of transaction data associated therewith, which may be used in platform attribution. That is, a processor or processors in the processing server 102, including at least a querying module 214, a data identification module 216, a generation module 218 and a transaction processing module 220, as shown in FIG. 2, is specifically programmed through executable code to uniquely configure a logic array in the processor to have a complex combination of logic operations to carry out the functions disclosed herein, which a general purpose computer is incapable of performing without this specific, unconventional programming, in one example. In the system 100, an advertising agency 104 or other content provider may electronically distribute content, such as an advertisement for the purchase of goods or services, a coupon, deal, or discount for the purchase of goods or services, or other suitable content to a plurality of different computing devices 106 via a communication network 108.

Each computing device 106 may be any type of computing device suitable for the receipt and display of content to a user, such as a desktop computer, laptop computer, notebook computer, tablet computer, cellular phone, smart phone, smart television, smart watch, wearable computing device, implantable computing device, etc. The communication network 108 may be any type of communication network suitable for performing the functions discussed herein, such as a cellular communication network, the Internet, a local area network, a radio frequency network, etc. In some instances, a plurality of different communication networks may be used in performing the functions discussed herein, such as the use of the Internet and a cellular communication network for electronic communications between the advertising agency 104 and the computing devices 106.

In the system 100, a consumer 110 may possess a plurality of different computing devices 106, which may be used in the receipt and browsing of content, such as advertisements or other content submitted by the advertising agency 104. The consumer 110 may use the computing device 106 and may be exposed to an advertisement provided by the advertising agency 104 for a particular product (e.g., a good or service). The consumer 110 may eventually make a decision to purchase the advertised product.

To affect the purchase, the consumer 110 may use a payment card 112 in the funding of a payment transaction for the advertised product from a merchant 114. In some embodiments, the payment card 112 may be a physical payment card provided to a point of sale device associated with the merchant 114, from which payment credentials are read (e.g., via magnetic stripe, near field communication, an integrated circuit, etc.). In other embodiments, the payment card 112 may be a virtual payment card, where associated payment credentials may be communicated to the computing systems of the merchant 114 electronically, perhaps through a point of sale or point device of interaction such as a check-out page displayed in a browser. For example, the consumer 110 may use a computing device 106 to convey payment details for the payment transaction. The computing device 106 may be configured to electronically transmit the payment details via near field communication, radio frequency, transmission over a network such as the Internet, or other suitable type of communication, the computing device 106 may display a machine-readable code encoded with the payment details for reading and decoding by the computing systems of the merchant 114, the computing device 106 may initiate the transmission of payment details to the computing systems of the merchant 114 via a third party, etc. Suitable methods for providing payment credentials to a merchant 114 computing system will be apparent to persons having skill in the relevant art.

In some embodiments, a computing device 106 may be provisioned with a digitized payment token in place of a traditional transaction account number for use in funding payment transactions. For example, the consumer 110 may register a computing device 106 with a token distribution platform, which may receive account credentials and authentication information from the consumer 110 and, once the consumer is authenticated as being authorized to request a digitized token for the transaction account, may generate and distribute a digitized payment token to the computing device 106. Methods for provisioning digitized payment tokens to computing devices 106 will be apparent to persons having skill in the relevant art. A payment token may be a digitized token that is conveyed to a merchant 114 computing system in place of a traditional transaction account number. The payment token may be used in the processing of the payment transaction where the related transaction account may be identified and the transaction processed accordingly using traditional methods. Payment tokens may be associated with a single computing device 106 such that if a different computing device attempts to use the payment token for funding of a payment transaction, the payment transaction may be denied accordingly. In such instances, payment tokens may be beneficial as the token details may be unusable outside of the specifically associated computing device 106.

The computing systems of the merchant 114 may be configured to electronically transmit transaction data, including the payment details provided by the consumer 110 (e.g., including a transaction account number or token details from the payment card 112 or a computing device 106), to a payment network 116 for processing using the payment rails. In some instances, the transaction data may be transmitted to one or more intermediate entities, such as an acquiring financial institution, gateway processor, etc., for forwarding to the payment network 116 in a transaction message using the payment rails. A transaction message may be a specially formatted data message that is formatted based on one or more standards governing the exchange of financial transaction messages, such as the International Organization for Standardization's ISO 8583 message. The transaction message may include a plurality of data elements configured to store data as set forth in the associated standards, which may include at least one data element configured to store a primary account number. The data element configured to store a primary account number may store the transaction account number or a token number associated with a digitized token, for use in funding the related payment transaction. A transaction message may also include additional data, such as a message type indicator indicative of a type of the transaction message. The payment network 116 may receive the transaction message and may process the payment transaction accordingly using traditional methods and systems, where, in instances where a digitized payment token is used, the transaction is processed using the transaction account associated with the digitized payment token. The exchange of transaction messages and processing of payment transactions is discussed in more detail below with respect to the process 700 illustrated in FIG. 7.

In the system 100, the processing server 102 may be configured to store token profiles associated with digitized payment tokens. Each token profile may include a digitized payment token or information in identification thereof (e.g., a digital token number), the associated transaction account number, and data associated with the computing device 106 to which the respective digitized payment token was distributed. The computing device data may include a device identifier, such as an identification number, registration number, serial number, media access control address, internet protocol address, username, e-mail address, phone number, etc., as well as additional data associated with the computing device 106, such as a make, model, manufacturer, form factor, architecture, type, geographic location, etc. In some embodiments, the processing server 102 may receive the data for token profiles from a token distribution platform configured to provision tokens to computing devices 106. In some instances, the processing server 102 may be a token distribution platform or may be part of a computing system configured to operate as a token distribution platform, and may identify the data for token profiles as a result of functions performed in connection therewith. In other embodiments, the processing server 102 may be configured to receive token profile data from a payment network 116 or other entity associated with such data, such as a financial institution (e.g., an issuing bank) associated with the transaction account to which a digitized payment token corresponds.

The processing server 102 may also be configured to store transaction data for payment transactions involving the digitized payment tokens and corresponding transaction accounts. In some embodiments, the payment network 116 may electronically transmit transaction data to the processing server 102 via the payment rails or a communication network 108. In some instances, the payment network 116 may transmit transaction messages to the processing server 102. In other instances, the payment network 116 may transmit transaction data parsed from the transaction messages in a separate data signal. The transaction data may include at least a digital token number or transaction account number used to fund the related payment transaction, and may also include additional data suitable for performing the functions discussed herein, such as consumer data, merchant data, point of sale data, product data, reward data, loyalty data, offer data, issuer data, acquirer data, etc. In some embodiments, the processing server 102 may be a part of the payment network 116 and may receive transaction data via internal communication and processing. In other embodiments, the processing server 102 may be configured to receive transaction messages from the payment network 116 for use in mapping digital token numbers to transaction account numbers, such as in instances where the processing server 102 may be part of a token distribution and processing platform.

The processing server 102 may be configured to identify related computing devices 106 using the token profile data. In one embodiment, an advertising agency 104 may electronically transmit a data signal to the processing server 102 using the communication network 108 that is superimposed with a device identifier associated with a computing device 106, such as a computing device 106 that the advertising agency 104 knows was exposed to an advertisement or other distributed content. The processing server 102 may receive the device identifier and may identify a token profile related to a digitized payment token distributed to that computing device 106 that includes the device identifier. The processing server 102 may then identify every token profile related to that token profile based on the inclusion of the same transaction account number included. The related token profiles may thus correspond to computing devices 106 that include tokens that are all associated with the same transaction account.

The processing server 102 may be configured to provide computing device data included in each of the identified related token profiles to the advertising agency 104 via the electronic transmission of a data signal superimposed therewith using the communication network 108. The advertising agency 104 may then receive the data, which may include data associated with each of the computing devices 106 associated with a transaction account (e.g., and therefore a consumer 110), which may be used by the advertising agency 104 in attribution. In some instances, the processing server 102 may also identify transaction data corresponding to one or more payment transactions involving the transaction account, such as by identifying transaction data for a payment transaction that includes the transaction account number or one of the digital token numbers included in the related token profiles. In some embodiments, the processing server 102 may receive transaction data for a payment transaction, which may then be used by the processing server 102 in the identification of the related token profiles, such as by identifying a token profile that includes a digital token number included in the received transaction data and the related token profiles or by identifying all token profiles that include a transaction account number included in the received transaction data. In such an instance, the processing server 102 may provide the computing device data to the advertising agency 104 without the receipt of a request from the advertising agency 104. In such instances, the processing server 102 may identify the advertising agency based on data stored in one of the identified token profiles. The transaction data may be electronically transmitted to the advertising agency 104 using the communication network 108 along with the computing device data, which may then be used by the advertising agency 104 in attribution.

For example, the advertising agency 104 may distribute an advertisement for a toaster to a wide selection to computing devices 106. A consumer 110 may be exposed to the advertisement on three different computing devices 106, and may eventually decide to purchase the toaster. The consumer 110 may go to a physical storefront of a merchant 114 and present a physical payment card 112 to purchase the toaster. The transaction may be processed by the payment network 116 and transaction data provided to the processing server 102, and the consumer 110 may receive their new toaster once the transaction is finalized. In traditional systems, the advertising agency 104 would be unaware of the consumer's purchase due to a physical payment card 112 being used. In instances where the consumer 110 may use one of the three computing devices 106 for the purchase, the advertising agency 104 would attribute the purchase to that one computing device 106, being unaware that the consumer 110 received the advertisement on two additional devices.

In the system 100, the advertising agency 104 may receive data identifying each of the three computing devices 106 associated with the consumer 110, as well as transaction data for the purchase, even in instances where a physical payment card 112 is used. The advertising agency 104 may be able to use the combined data to identify attribution for the purchase. For instance, in a first example, the advertising agency 104 may identify that the consumer 110 was exposed to the advertisement three separate times (e.g., once on each computing device 106) and may attribute the purchase to each of the three platforms used to deliver the advertisement. In a second example, the transaction details may indicate that the transaction was conducted before the consumer 110 was shown the advertisement on their third computing device 106, which may thus result in attribution to only the first two platforms. In some instances, the advertising agency 104 may also be able to use the computing device data for calculating metrics regarding advertisements, platforms, and purchasing. For example, the advertising agency 104 may identify more accurate data regarding the number of exposures to an advertisement before purchase, the length of time between first exposure and purchase, the effectiveness of some platforms over others for purchases, etc. In some embodiments, the metrics may be calculated by the processing server 102, such as based on information associated with the exposure of the advertisement. In such an embodiment, the processing server 102 may provide the metrics to the advertising agency 104 along with the identified computing device data.

Processing Server

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 116 for the transmission of transaction messages that include sensitive financial data and information. In some instances, the receiving device 202 may also be configured to receive data from advertising agencies 104, computing devices 106, merchants 114, payment networks 116, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by advertising agencies 104, which may be superimposed with data requests. The data requests may include specific computing device identifiers, associated with a computing device 106 for which the advertising agency 104 wants related device and/or transaction data for use in attribution. In some instances, the data request may identify transaction data, such as a product for which transaction and related device data is identified. The receiving device 202 may also receive data signals from the advertising agencies 104 superimposed with device identifiers for use in identification of the advertising agency 104, such as in instances when transaction data is received related to a computing device to which the advertising agency 104 is associated. The receiving device 202 may also be configured to receive transaction data, such as via transaction messages or other data signals electronically transmitted by the payment network 116 using the payment rails r a communication network 108. The receiving device 202 may also be configured to receive token and computing device data, such as from the payment network 116, computing devices 106, financial institutions, token profile distribution platforms, and other suitable entities.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, data identification module 216, generation module 218, transaction processing module 220, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a token profile database 206. The token profile database 206 may be configured to store a plurality of token profiles 208 using a suitable data storage format and schema. The token profile database 206 may be a relational database that utilizes structured query language for the storage, identification, modifying, updating, accessing, etc. of structured data sets stored therein. Each token profile 208 may be a structured data set configured to store data associated with a digitized payment token, which may include at least a digital token number, a transaction account number for the transaction account associated with the digitized payment token, and a computing device identifier and additional computing device data associated with a computing device 106 to which the digitized payment token was provisioned.

The processing server 102 may also include a transaction database 210. The transaction database 210 may be configured to store a plurality of transaction data entries 212 using a suitable data storage format and schema. The transaction database 210 may be a relational database that utilizes structured query language for the storage, identification, modifying, updating, accessing, etc. of structured data sets stored therein. Each transaction data entry 212 may be a structured data set configured to store data related to a payment transaction, including at least a digital token number or transaction account number used in the funding of the related payment transaction, and additional transaction data, which may include a transaction amount, transaction time and/or date, geographic location, consumer data, merchant data, point of sale data, reward data, offer data, loyalty data, product data, issuer data, acquirer data, etc. In some embodiments, each transaction data entry 212 may be a transaction message formatted based on one or more standards, such as the ISO 8583 standard. Each transaction message may include a plurality of data elements configured to store the transaction data included therein, including a data element configured to store a primary account number, which may store the digital token number or transaction account number used to fund the related payment transaction.

The processing server 102 may include a querying module 214. The querying module 214 may be configured to execute queries on databases to identify information. The querying module 214 may receive one or more data values or query strings, and may execute a query string based thereon on an indicated database, such as the token profile database 206 and transaction database 210, to identify information stored therein. The querying module 214 may then output the identified information to an appropriate engine or module of the processing server 102 as necessary. The querying module 214 may, for example, execute a query on the token profile database 206 to identify a token profile 208 stored therein that includes a computing device identifier corresponding to a device identifier parsed from a data request received by the receiving device 202. The querying module 214 may output the identified token profile 208 to a data identification module 216.

The data identification module 216 may be configured to analyze data and identify data based thereon and in data received and retrieved by the other modules and engines of the processing server 102. The data identification module 216 may receive an instruction, and, in some instances, data, may identify data based on the instruction, and may output the identified data. For example, the data identification module 216 may receive a token profile 208 identified by the querying module 214 (e.g., based on a received data request) with an instruction to identify related token profiles and transaction data. The data identification module 216 may generate a query configured to identify token profiles 208 in the token profile database 206 that include the same transaction account number included in the provided token profile 208, which may be passed to the querying module 214 for execution thereby. The related token profiles 208 may be identified and provided to the data identification module 216. The data identification module 216 may also be configured to identify transaction data related to the identified token profiles 208, such as by generating a query configured to identify transaction data entries 212 in the transaction database 210 that include the transaction account number common to the identified token profiles 208 or that include a digital token number included in one of the identified token profiles 208. The query may be passed to the querying module 214 for execution thereby in identifying the related transaction data. In some instances, the data identification module 216 may generate the query for identification of a limited number of transaction data entries 212, such as for the most recent transaction or the most recent transaction for a specific product or at a specific merchant. In some embodiments, the data identification module 216 may also be configured to identify data associated with the attribution of an advertisement to a transaction. In such embodiments, the data identification module 216 may be configured to identify one or more metrics associated with the attribution of an advertisement to an identified transaction data entry 212. Such metrics may include, for example, data regarding the number of exposures to an advertisement before purchase, the length of time between first exposure and purchase, the effectiveness of some platforms over others for purchases, etc.

The generation module 218 may be configured to generate data messages for transmission by the processing server 102 to other entities, such as to the advertising agency 104. The generation module 218 may receive data to be included in a data message as input, may generate the data message, and may provide the data message as output to another module or engine of the processing server 102 for use thereof. For example, the generation module 218 may generate a data message that includes computing device data included in the identified related token profiles 208 and transaction data identified by the data identification module 216, which may be passed to the transmitting device 222 for transmission to the advertising agency 104.

The transmitting device 222 may be configured to transmit data over one or more networks via one or more network protocols. In some embodiments, the transmitting device 222 may be configured to transmit data over the payment rails, such as using specially configured infrastructure associated with payment networks 116 for the transmission of transaction messages that include sensitive financial data and information, such as identified payment credentials. In some instances, the transmitting device 222 may be configured to transmit data to advertising agencies 104, computing devices 106, merchants 114, payment networks 116, and other entities via alternative networks, such as the Internet. In some embodiments, the transmitting device 222 may be comprised of multiple devices, such as different transmitting devices for transmitting data over different networks, such as a first transmitting device for transmitting data over the payment rails and a second transmitting device for transmitting data over the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to advertising agencies 104 that are superimposed with data messages generated by the generation module 218, such as data messages including related computing device data and transaction data. The transmitting device 222 may also be configured to electronically transmit data signals to the advertising agency 104, payment network 116, and other entities that are superimposed with data requests, such as to request token profile data, computing device data, transaction data, and other data that may be suitable in performing the functions discussed herein.

In some embodiments, the processing server 102 may also include a transaction processing module 220. The transaction processing module 220 may be configured to perform functions related to the processing of payment transactions, such as in instances where the processing server 102 may be a part of the payment network 116 or other entity involved in the processing of payment transactions, such as a digitized payment token processing entity. For example, the transaction processing module 220 may be configured to remap digital token numbers to transaction account numbers (e.g., as identified in corresponding token profiles 208), to calculate fraud scores for payment transactions based on transaction data, identify financial institutions for routing of transaction messages, etc.

The processing server 102 may also include a memory 224. The memory 224 may be configured to store data for use by the processing server 102 in performing the functions discussed herein. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art.

Process for Identifying Related Computing Devices and Transaction Data

Figure 3:
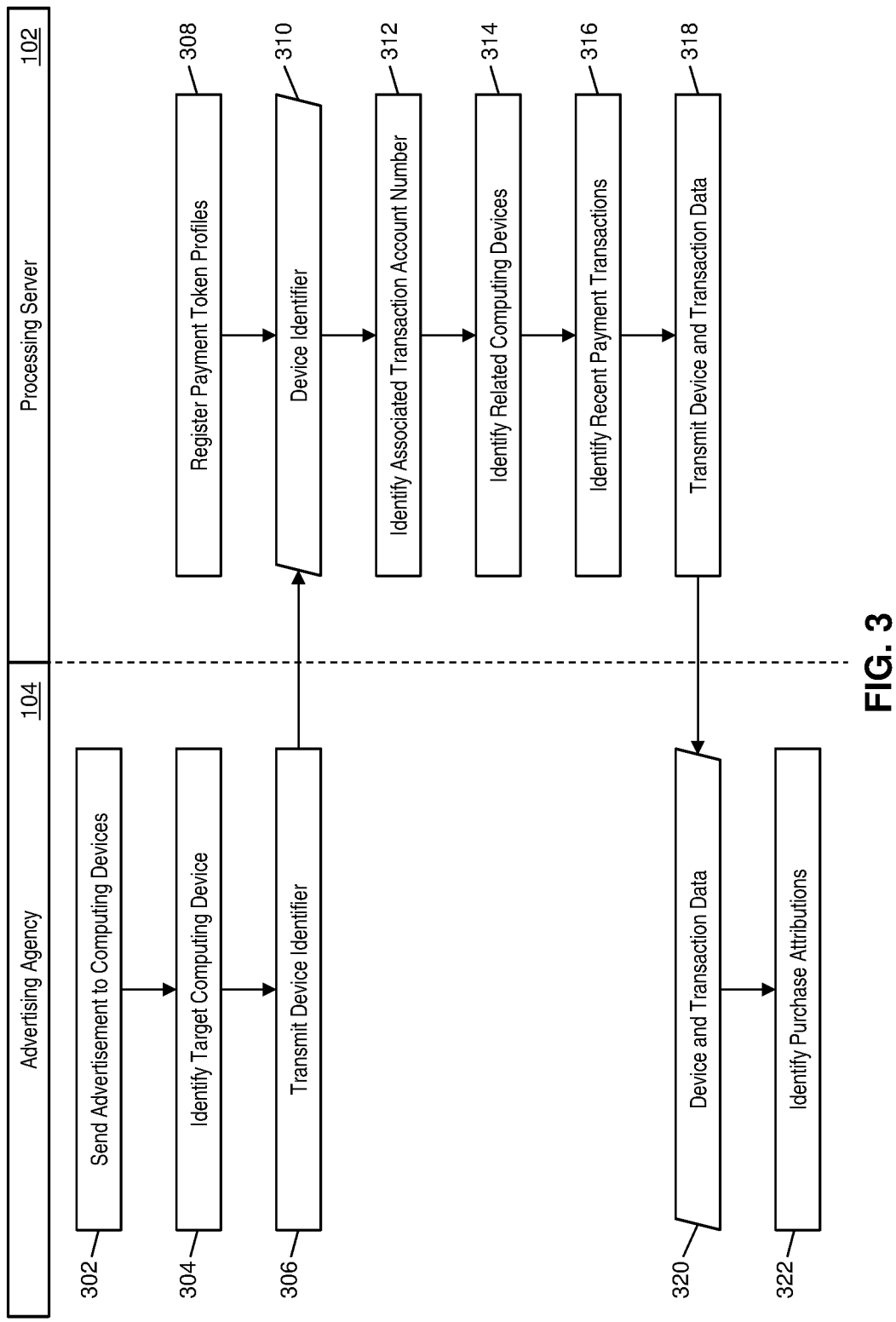
FIG. 3 is a flow diagram illustrating a process for identifying computing devices and transaction data related to a provided computing device via digitized tokens and corresponding transaction account data in accordance with exemplary embodiments.

FIG. 3 illustrates a process for the identification of computing devices and transaction data related to a provided computing device via digitized payment tokens and a corresponding transaction account.

In step 302, the advertising agency 104 may distribute an advertisement or other content to a plurality of computing devices 106 using a suitable distribution method, such as by providing the advertisement to one or more content distribution platforms for display to user of the computing devices 106, such as in application programs, on web pages, etc. In step 304, the advertising agency 104 may identify a target computing device 106 for which the advertising agency 104 requests data regarding related computing devices and transaction data. For instance, in one example the advertising agency 104 may identify the target computing device 104 as one where the user interacts with the distributed advertisement. In another example, the advertising agency 104 may identify the target computing device 104 as one where related computing devices are unknown, such as for enhancement of analytics.

In step 306, the advertising agency 104 may electronically transmit a data signal superimposed with a data request to the processing server 102 via the communication network 108 that is superimposed with a specific computing device identifier that is associated with the target computing device 106 identified by the advertising agency 104 in step 304. In step 308, the processing server 102 may register a plurality of payment token profiles 208 in the token profile database 206 stored therein. Each token profile 208 may include data related to a digitized payment token including at least a digital token number, an associated transaction account number, a computing device identifier, and computing device data.

In step 310, the receiving unit 202 of the processing server 102 may receive the data signal electronically transmitted by the advertising agency 104 that includes the data request including the specific computing device identifier. The specific computing device identifier may be parsed from the data request and, in step 312, the querying module 214 of the processing server 102 may execute a query on the token profile database 206 to identify a token profile 208 where the included computing device identifier corresponds to the specific computing device identifier parsed from the data request. The data identification module 216 of the processing server 102 may identify the transaction account number included in the identified token profile 208 as the transaction account number corresponding to the transaction account associated with the target computing device 106. In step 314, the data identification module 216 may instruct the querying module 214 to query the token profile database 206 to identify a plurality of related token profiles 208 that include the identified transaction account number for the identification of related computing devices 106.

In step 316, the data identification module 216 of the processing server 102 may identify recent payment transactions involving the transaction account related to the target computing device 106. The identification may involve the providing of a query to the querying module 214 for the querying of the transaction database 210 to identify transaction data entries 212 that are related to recent payment transactions (e.g., based on transaction times and/or dates included therein) that include the transaction account number associated with the transaction account or that include a digital token number included in one of the plurality of related token profiles 108 or the identified token profile 108 associated with the target computing device 106.

In step 318, the generation module 218 of the processing server 102 may generate a data message that includes the identified transaction data and the computing device data included in the identified related token profiles 208, which may be electronically transmitted to the advertising agency 104 by the transmitting device 222 of the processing server using the communication network 108. In step 320, the advertising agency 104 may receive the computing device data and transaction data. In step 322, the advertising agency 104 may identify attributions for purchases made using the transaction account based on the distribution of advertisements to each of the computing devices based on the computing device data. In some instances, the advertising agency 104 may use the computing device data and purchase data for identifying patterns and metrics regarding purchases and platform attribution.

Process for Identifying Computing Devices Related to Transaction Data

Figure 4:
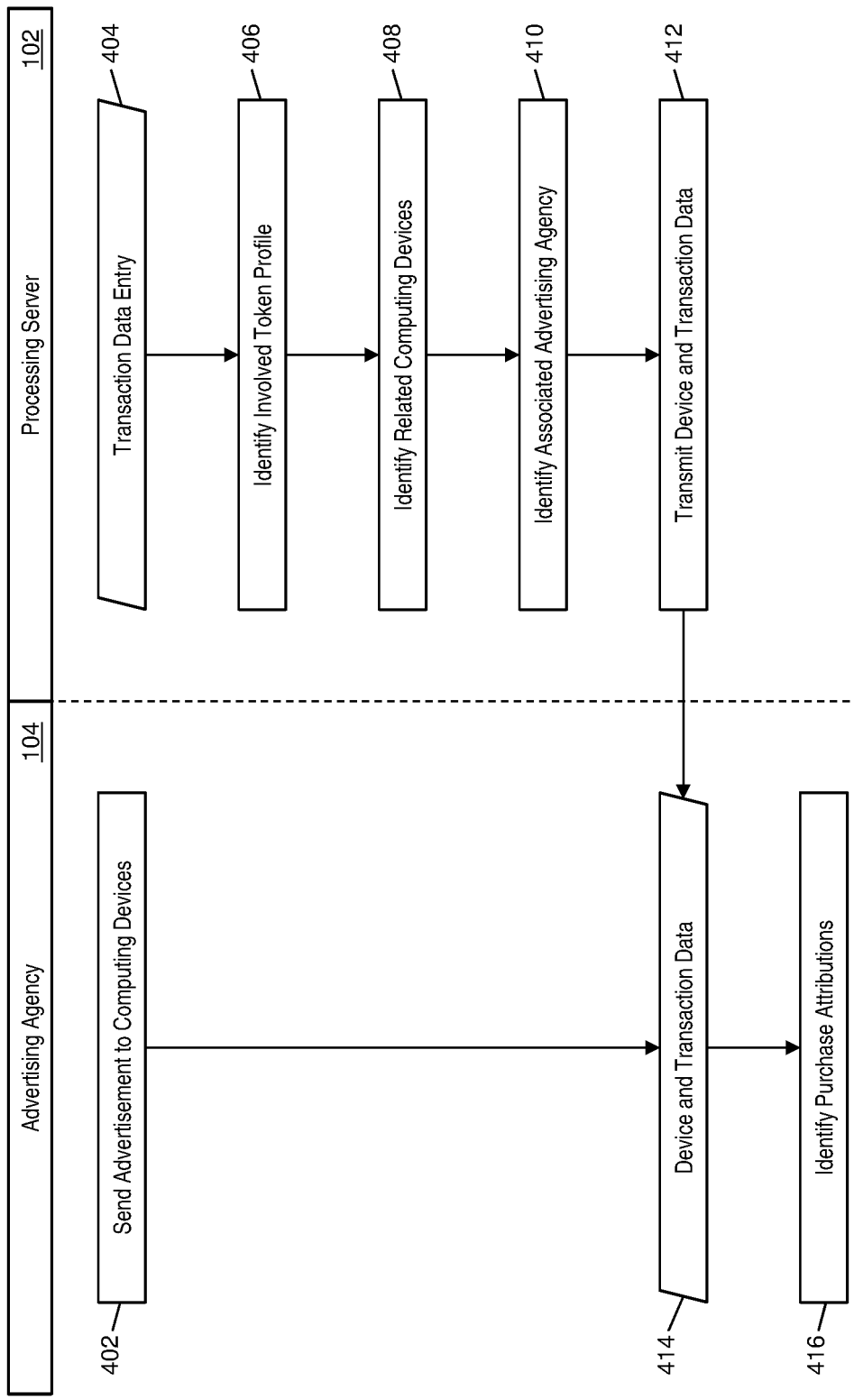
FIG. 4 is a flow diagram illustrating a process for identifying computing devices related to a payment transaction via digitized tokens and corresponding transaction account data in accordance with exemplary embodiments.

FIG. 4 illustrates a process for the identification of related computing devices that are related to transaction data via digitized payment tokens and a corresponding transaction account.

In step 402, the advertising agency 104 may distribute an advertisement or other content to a plurality of computing devices 106 using a suitable method. In some instances, the advertising agency 104 may track when the advertisement was sent to which computing device 106 in addition to known data associated with each computing device 106, such as for use in determining various statistics and metrics regarding advertisement distribution and purchase attribution. In step 404, the receiving device 202 of the processing server 102 may receive a transaction data entry corresponding to a payment transaction processed by the payment network 116. The transaction data entry may include at least a digital token number or a transaction account number use to fund the related payment transaction. In some instances, the transaction data entry may be a transaction message formatted based on one or more standards, such as the ISO 8583 standard, which may include a data element configured to store a primary account number, which may store the digital token number or transaction account number.

In step 406, the data identification module 216 of the processing server 102 may identify a token profile 208 involved in the payment transaction related to the received transaction data entry. The data identification module 216 may generate a query for execution by the querying module 214 of the processing server 102 to query the token profile database 206 to identify a specific token profile 208 that includes the digital token number included in the received transaction data entry. The transaction account number included therein may be identified as related to the transaction account involved in the payment transaction. In embodiments where the transaction data entry may include the transaction account number, step 406 may be an optional step.

In step 408, the data identification module 216 may identify a plurality of computing devices 106 related to the computing device 106 corresponding to the identified specific token profile 208. The identification of the plurality of computing devices 106 may include generating a query to be executed by the querying module 214 on the token profile database 206 to identify a plurality of related token profiles 208 where the included transaction account number corresponds to the transaction account number included in the specific token profile 208 and/or the received transaction data. The computing device data included in each of the plurality of related token profiles 208 may then be identified as computing device data related to the computing devices 106 related to the transaction account used to fund the payment transaction. In step 410, the data identification module 216 may identify an advertising agency 104 associated with the transaction account, one of the plurality of computing devices 106, and/or the payment transaction. Identification of the advertising agency 104 may include identifying data associated therewith included in the identified token profiles 208 or stored in the memory 224 that includes a corresponding between the advertising agency 104 and the transaction data entry. For example, the payment transaction may involve the purchase of a product (e.g., indicated in product data included therein) for which the advertising agency 104 is associated (e.g., as stored in the memory 224 based on data provided by the advertising agency 104).

In step 412, the generation module 218 of the processing server 102 may generate a data message that includes the computing device data associated with each of the plurality of computing devices 106, as well as the transaction data included in the received transaction data entry. The transmitting device 222 of the processing server 102 may electronically transmit the generated data message to the advertising agency 104 via superimposition on a data signal electronically transmitted to the advertising agency 104 using the communication network 108. In step 414, the advertising agency 104 may receive the data signal and parse the signal to obtain the data message and data included therein, and, in step 416, may identify attributions for the purchase based on the computing device data and data related to the distribution of advertisements thereto.

Figure 5:
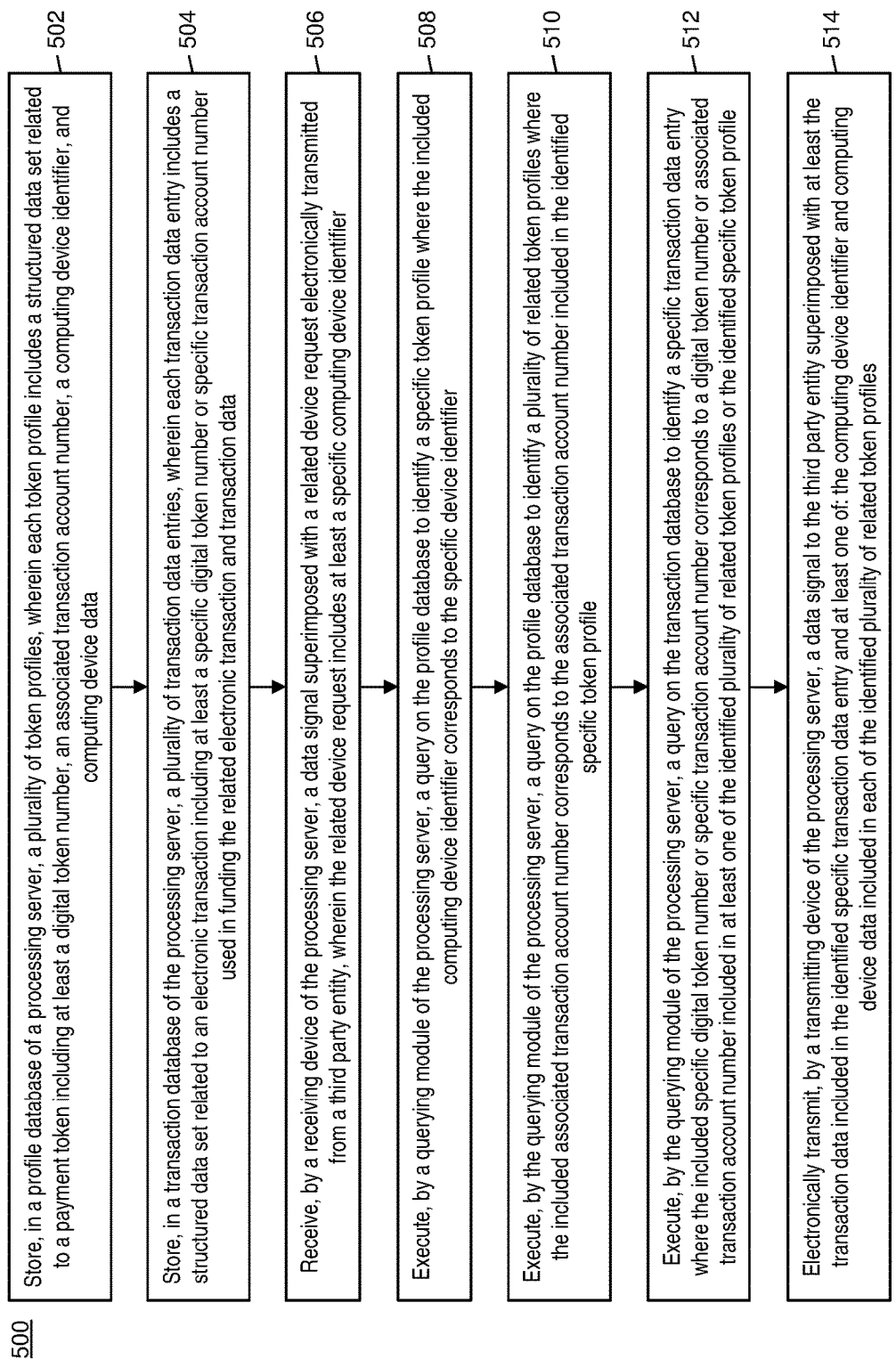
FIGS. 5 and 6 are flow charts illustrating exemplary methods for identifying a plurality of related computing devices related to a transaction account in accordance with exemplary embodiments.

First Exemplary Method for Identifying a Plurality of Related Computing Devices Related to a Transaction Account FIG. 5 illustrates a method 500 for the identification of a plurality of computing devices related to a transaction account via digitized payment tokens that is associated with a computing device identified in a received data request.

In step 502, a plurality of token profiles (e.g., token profiles 208) may be stored in a token profile database (e.g., the token profile database 206) of a processing server (e.g., the processing server 102), wherein each token profile includes a structured data set related to a payment token including at least a digital token number, an associated transaction account number, a computing device identifier, and computing device data. In step 504, a plurality of transaction data entries (e.g., transaction data entries 212) may be stored in a transaction database (e.g., the transaction database 210) of a processing server, wherein each transaction data entry includes a structured data set related to an electronic transaction including at least a specific digital token number or specific transaction account number used in funding the related electronic transaction and transaction data.

In step 506, a data signal superimposed with a related device request may be received by a receiving device (e.g., the receiving device 202) of the processing server that is electronically transmitted from a third party entity (e.g., the advertising agency 104), wherein the related device request includes at least a specific computing device identifier. In step 508, a query may be executed by a querying module (e.g., the querying module 214) of the processing server on the token profile database to identify a specific token profile where the included computing device identifier corresponds to the specific computing device identifier. In step 510, a query may be executed by the querying module of the processing server on the token profile database to identify a plurality of related token profiles where the included associated transaction account number corresponds to the associated transaction account number included in the identified specific token profile.

In step 512, a query may be executed by the querying module of the processing server on the transaction database to identify a specific transaction data entry where the included specific digital token number or specific transaction account number corresponds to a digital token number or associated transaction account number included in at least one of the identified plurality of related token profiles or the identified specific token profile. In step 514, a data signal may be electronically transmitted to the third party entity by a transmitting device (e.g., the transmitting device 222) of the processing server that is superimposed with at least the transaction data included in the identified specific transaction data entry and at least one of: the computing device identifier and computing device data included in each of the identified plurality of related token profiles.

In one embodiment, each transaction data entry may be a transaction message formatted based on one or more standards, and the specific digital token number or specific transaction account number included in each transaction data entry is stored in a data element included in the respective transaction message configured to store a primary account number. In a further embodiment, the one or more standards may include the ISO 8583 standard. In some embodiments, the computing device data may include at least one of: make, manufacturer, model, form factor, architecture, type, and geographic location.

Figure 6:
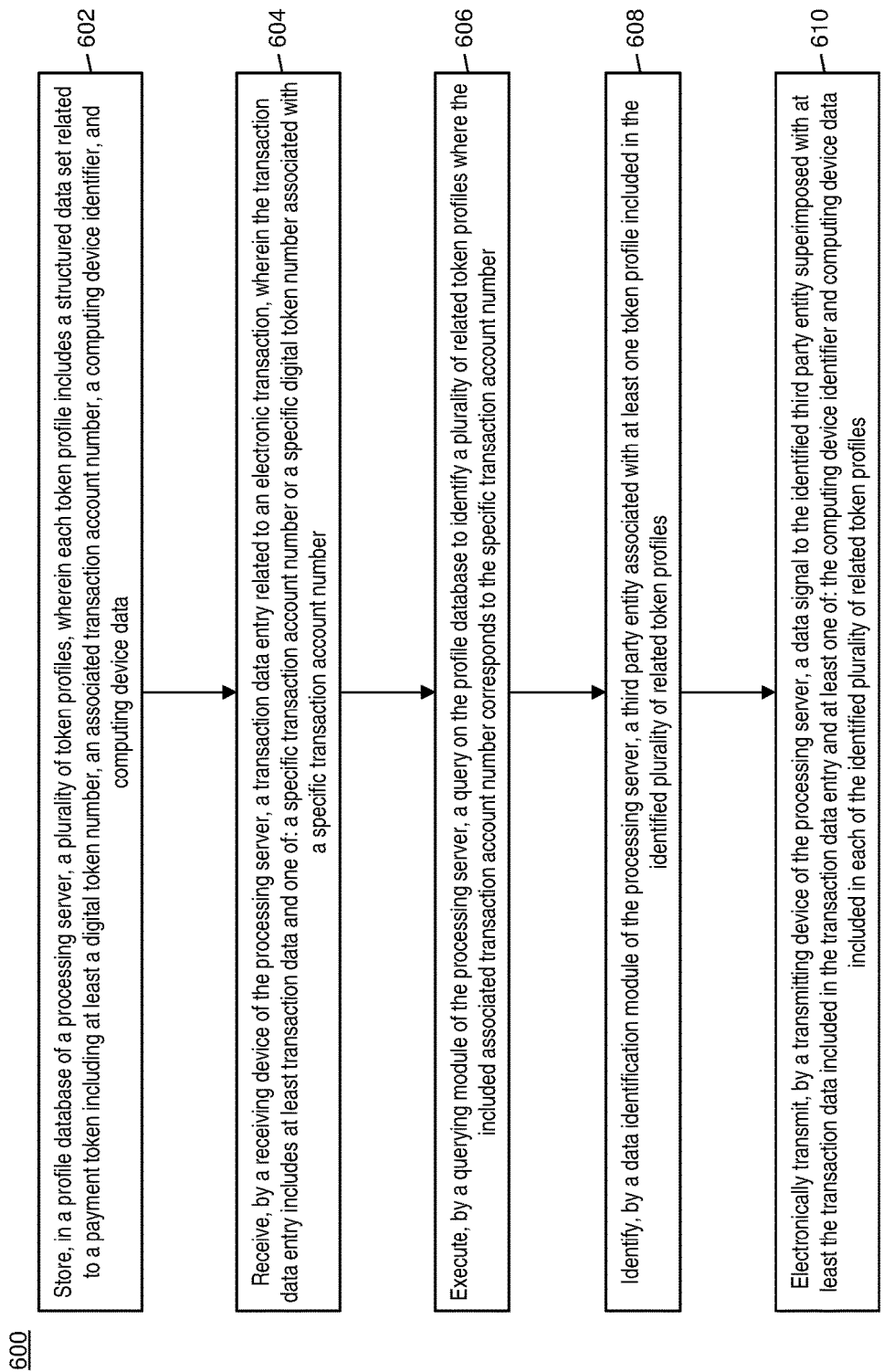

Second Exemplary Method for Identifying a Plurality of Related Computing Devices Related to a Transaction Account FIG. 6 illustrates a method 600 for the identification of a plurality of computing devices related to a transaction account used in a payment transaction related to received transaction data via digitized payment tokens.

In step 602, a plurality of token profiles (e.g., token profiles 208) may be stored in a token profile database (e.g., the token profile database 206) of a processing server (e.g., the processing server 102), wherein each token profile includes a structured data set related to a payment token including at least a digital token number, an associated transaction account number, a computing device identifier, and computing device data. In step 604, a transaction data entry related to an electronic transaction may be received by a receiving device (e.g., the receiving device 202) of the processing server, wherein the transaction data entry includes at least transaction data and one of: a specific transaction account number or a specific digital token number associated with a specific transaction account number.

In step 606, a query may be executed by a querying module (e.g., the querying module 214) of the processing server on the token profile database to identify a plurality of related token profiles where the included associated transaction account number corresponds to the specific transaction account number. In step 608, a data identification module (e.g., the data identification module 216) of the processing server may identify a third party entity (e.g., the advertising agency 104) associated with at least one token profile included in the identified plurality of related token profiles. In step 610, a data signal may be electronically transmitted by a transmitting device (e.g., the transmitting device 222) of the processing server to the identified third party entity, where the data signal is superimposed with at least the transaction data included in the transaction data entry and at least one of: the computing device identifier and computing device data included in each of the identified plurality of related token profiles.

In one embodiment, each transaction data entry may be a transaction message formatted based on one or more standards, and the specific digital token number or specific transaction account number included in each transaction data entry is stored in a data element included in the respective transaction message configured to store a primary account number. In a further embodiment, the one or more standards may include the ISO 8583 standard. In some embodiments, the computing device data may include at least one of: make, manufacturer, model, form factor, architecture, type, and geographic location.

In one embodiment, the method 600 may also include executing, by the querying module of the processing server, a query on the token profile database to identify a specific token profile where the included digital token number corresponds to the specific digital token number included in the received transaction data entry if the received transaction data entry includes a specific digital token number, wherein the associated specific transaction account number corresponds to the associated transaction account number included in the identified specific token profile. In some embodiments, the at least one token profile associated with the third party entity may be included in the identified plurality of related token profiles includes communication data associated with the third party entity, and identifying the third party entity may include executing, by the querying module of the processing server, a query on the identified plurality of related token profiles to identify the at least one token profile including communication data associated with the third party entity.

Payment Transaction Processing System and Process

Figure 7:
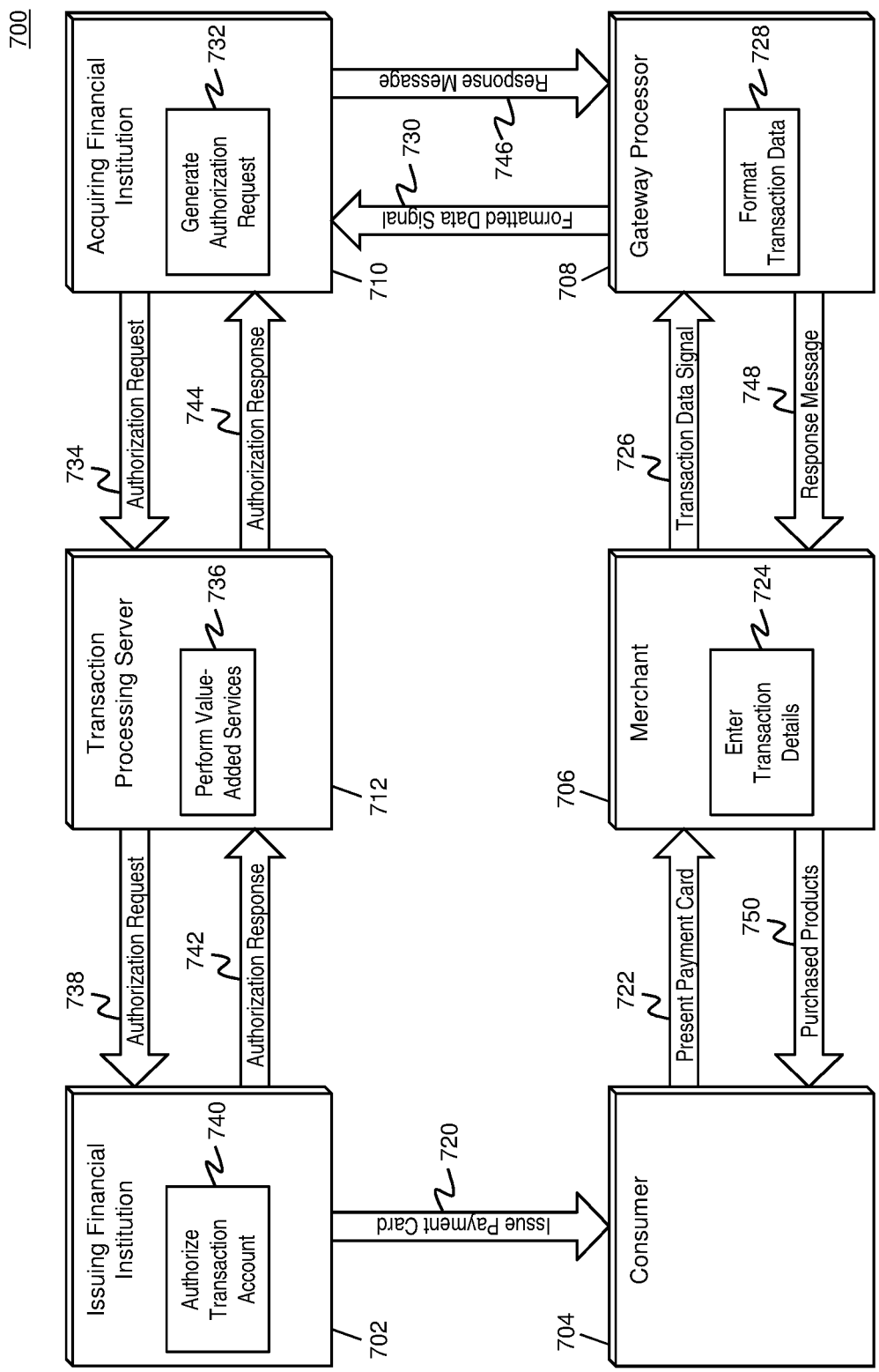
FIG. 7 is a flow diagram illustrating the processing of a payment transaction in accordance with exemplary embodiments.

FIG. 7 illustrates a transaction processing system and a process 700 for the processing of payment transactions in the system. The process 700 and steps included therein may be performed by one or more components of the system 100 discussed above, such as the processing server 102, computing devices 106, merchant 114, payment network 116, etc. The processing of payment transactions using the system and process 700 illustrated in FIG. 7 and discussed below may utilize the payment rails, which may be comprised of the computing devices and infrastructure utilized to perform the steps of the process 700 as specially configured and programmed by the entities discussed below, including the transaction processing server 712, which may be associated with one or more payment networks configured to processing payment transactions. It will be apparent to persons having skill in the relevant art that the process 700 may be incorporated into the processes illustrated in FIGS. 3-6, discussed above, with respect to the step or steps involved in the processing of a payment transaction. In addition, the entities discussed herein for performing the process 700 may include one or more computing devices or systems configured to perform the functions discussed below. For instance, the merchant 706 may be comprised of one or more point of sale devices, a local communication network, a computing server, and other devices configured to perform the functions discussed below.

In step 720, an issuing financial institution 702 may issue a payment card or other suitable payment instrument to a consumer 704. The issuing financial institution may be a financial institution, such as a bank, or other suitable type of entity that administers and manages payment accounts and/or payment instruments for use with payment accounts that can be used to fund payment transactions. The consumer 704 may have a transaction account with the issuing financial institution 702 for which the issued payment card is associated, such that, when used in a payment transaction, the payment transaction is funded by the associated transaction account. In some embodiments, the payment card may be issued to the consumer 704 physically. In other embodiments, the payment card may be a virtual payment card or otherwise provisioned to the consumer 704 in an electronic format.

In step 722, the consumer 704 may present the issued payment card to a merchant 706 for use in funding a payment transaction. The merchant 706 may be a business, another consumer, or any entity that may engage in a payment transaction with the consumer 704. The payment card may be presented by the consumer 704 via providing the physical card to the merchant 706, electronically transmitting (e.g., via near field communication, wireless transmission, or other suitable electronic transmission type and protocol) payment details for the payment card, or initiating transmission of payment details to the merchant 706 via a third party. The merchant 706 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 724, the merchant 706 may enter transaction details into a point of sale computing system. The transaction details may include the payment details provided by the consumer 704 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 706 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 706 may be an online retailer in an e-commerce transaction. In such embodiments, the transaction details may be entered in a shopping cart or other repository for storing transaction data in an electronic transaction as will be apparent to persons having skill in the relevant art.

In step 726, the merchant 706 may electronically transmit a data signal superimposed with transaction data to a gateway processor 708. The gateway processor 708 may be an entity configured to receive transaction details from a merchant 706 for formatting and transmission to an acquiring financial institution 710. In some instances, a gateway processor 708 may be associated with a plurality of merchants 706 and a plurality of acquiring financial institutions 710. In such instances, the gateway processor 708 may receive transaction details for a plurality of different transactions involving various merchants, which may be forwarded on to appropriate acquiring financial institutions 710. By having relationships with multiple acquiring financial institutions 710 and having the requisite infrastructure to communicate with financial institutions using the payment rails, such as using application programming interfaces associated with the gateway processor 708 or financial institutions used for the submission, receipt, and retrieval of data, a gateway processor 708 may act as an intermediary for a merchant 706 to be able to conduct payment transactions via a single communication channel and format with the gateway processor 708, without having to maintain relationships with multiple acquiring financial institutions 710 and payment processors and the hardware associated thereto. Acquiring financial institutions 710 may be financial institutions, such as banks, or other entities that administers and manages payment accounts and/or payment instruments for use with payment accounts. In some instances, acquiring financial institutions 710 may manage transaction accounts for merchants 706. In some cases, a single financial institution may operate as both an issuing financial institution 702 and an acquiring financial institution 710.

The data signal transmitted from the merchant 706 to the gateway processor 708 may be superimposed with the transaction details for the payment transaction, which may be formatted based on one or more standards. In some embodiments, the standards may be set forth by the gateway processor 708, which may use a unique, proprietary format for the transmission of transaction data to/from the gateway processor 708. In other embodiments, a public standard may be used, such as the International Organization for Standardization's ISO 8783 standard. The standard may indicate the types of data that may be included, the formatting of the data, how the data is to be stored and transmitted, and other criteria for the transmission of the transaction data to the gateway processor 708.

In step 728, the gateway processor 708 may parse the transaction data signal to obtain the transaction data superimposed thereon and may format the transaction data as necessary. The formatting of the transaction data may be performed by the gateway processor 708 based on the proprietary standards of the gateway processor 708 or an acquiring financial institution 710 associated with the payment transaction. The proprietary standards may specify the type of data included in the transaction data and the format for storage and transmission of the data. The acquiring financial institution 710 may be identified by the gateway processor 708 using the transaction data, such as by parsing the transaction data (e.g., deconstructing into data elements) to obtain an account identifier included therein associated with the acquiring financial institution 710. In some instances, the gateway processor 708 may then format the transaction data based on the identified acquiring financial institution 710, such as to comply with standards of formatting specified by the acquiring financial institution 710. In some embodiments, the identified acquiring financial institution 710 may be associated with the merchant 706 involved in the payment transaction, and, in some cases, may manage a transaction account associated with the merchant 706.

In step 730, the gateway processor 708 may electronically transmit a data signal superimposed with the formatted transaction data to the identified acquiring financial institution 710. The acquiring financial institution 710 may receive the data signal and parse the signal to obtain the formatted transaction data superimposed thereon. In step 732, the acquiring financial institution may generate an authorization request for the payment transaction based on the formatted transaction data. The authorization request may be a specially formatted transaction message that is formatted pursuant to one or more standards, such as the ISO 8783 standard and standards set forth by a payment processor used to process the payment transaction, such as a payment network. The authorization request may be a transaction message that includes a message type indicator indicative of an authorization request, which may indicate that the merchant 706 involved in the payment transaction is requesting payment or a promise of payment from the issuing financial institution 702 for the transaction. The authorization request may include a plurality of data elements, each data element being configured to store data as set forth in the associated standards, such as for storing an account number, application cryptogram, transaction amount, issuing financial institution 702 information, etc.

In step 734, the acquiring financial institution 710 may electronically transmit the authorization request to a transaction processing server 712 for processing. The transaction processing server 712 may be comprised of one or more computing devices as part of a payment network configured to process payment transactions. In some embodiments, the authorization request may be transmitted by a transaction processor at the acquiring financial institution 710 or other entity associated with the acquiring financial institution. The transaction processor may be one or more computing devices that include a plurality of communication channels for communication with the transaction processing server 712 for the transmission of transaction messages and other data to and from the transaction processing server 712. In some embodiments, the payment network associated with the transaction processing server 712 may own or operate each transaction processor such that the payment network may maintain control over the communication of transaction messages to and from the transaction processing server 712 for network and informational security.

In step 736, the transaction processing server 712 may perform value-added services for the payment transaction. Value-added services may be services specified by the issuing financial institution 702 that may provide additional value to the issuing financial institution 702 or the consumer 704 in the processing of payment transactions. Value-added services may include, for example, fraud scoring, transaction or account controls, account number mapping, offer redemption, loyalty processing, etc. For instance, when the transaction processing server 712 receives the transaction, a fraud score for the transaction may be calculated based on the data included therein and one or more fraud scoring algorithms and/or engines. In some instances, the transaction processing server 712 may first identify the issuing financial institution 702 associated with the transaction, and then identify any services indicated by the issuing financial institution 702 to be performed. The issuing financial institution 702 may be identified, for example, by data included in a specific data element included in the authorization request, such as an issuer identification number. In another example, the issuing financial institution 702 may be identified by the primary account number stored in the authorization request, such as by using a portion of the primary account number (e.g., a bank identification number) for identification.

In step 738, the transaction processing server 712 may electronically transmit the authorization request to the issuing financial institution 702. In some instances, the authorization request may be modified, or additional data included in or transmitted accompanying the authorization request as a result of the performance of value-added services by the transaction processing server 712. In some embodiments, the authorization request may be transmitted to a transaction processor (e.g., owned or operated by the transaction processing server 712) situated at the issuing financial institution 702 or an entity associated thereof, which may forward the authorization request to the issuing financial institution 702.

In step 740, the issuing financial institution 702 may authorize the transaction account for payment of the payment transaction. The authorization may be based on an available credit amount for the transaction account and the transaction amount for the payment transaction, fraud scores provided by the transaction processing server 712, and other considerations that will be apparent to persons having skill in the relevant art. The issuing financial institution 702 may modify the authorization request to include a response code indicating approval (e.g., or denial if the transaction is to be denied) of the payment transaction. The issuing financial institution 702 may also modify a message type indicator for the transaction message to indicate that the transaction message is changed to be an authorization response. In step 742, the issuing financial institution 702 may transmit (e.g., via a transaction processor) the authorization response to the transaction processing server 712.

In step 744, the transaction processing server 712 may forward the authorization response to the acquiring financial institution 710 (e.g., via a transaction processor). In step 746, the acquiring financial institution may generate a response message indicating approval or denial of the payment transaction as indicated in the response code of the authorization response, and may transmit the response message to the gateway processor 708 using the standards and protocols set forth by the gateway processor 708. In step 748, the gateway processor 708 may forward the response message to the merchant 706 using the appropriate standards and protocols. In step 770, the merchant 706 may then provide the products purchased by the consumer 704 as part of the payment transaction to the consumer 704.

In some embodiments, once the process 700 has completed, payment from the issuing financial institution 702 to the acquiring financial institution 710 may be performed. In some instances, the payment may be made immediately or within one business day. In other instances, the payment may be made after a period of time, and in response to the submission of a clearing request from the acquiring financial institution 710 to the issuing financial institution 702 via the transaction processing server 712. In such instances, clearing requests for multiple payment transactions may be aggregated into a single clearing request, which may be used by the transaction processing server 712 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 740), the transaction processing server 712 may be configured to perform authorization of transactions on behalf of the issuing financial institution 702. Such actions may be referred to as "stand-in processing," where the transaction processing server "stands in" as the issuing financial institution 702. In such instances, the transaction processing server 712 may utilize rules set forth by the issuing financial institution 702 to determine approval or denial of the payment transaction, and may modify the transaction message accordingly prior to forwarding to the acquiring financial institution 710 in step 744. The transaction processing server 712 may retain data associated with transactions for which the transaction processing server 712 stands in, and may transmit the retained data to the issuing financial institution 702 once communication is reestablished. The issuing financial institution 702 may then process transaction accounts accordingly to accommodate for the time of lost communication.

In another example, if the transaction processing server 712 is unavailable for submission of the authorization request by the acquiring financial institution 710, then the transaction processor at the acquiring financial institution 710 may be configured to perform the processing of the transaction processing server 712 and the issuing financial institution 702. The transaction processor may include rules and data suitable for use in making a determination of approval or denial of the payment transaction based on the data included therein. For instance, the issuing financial institution 702 and/or transaction processing server 712 may set limits on transaction type, transaction amount, etc. that may be stored in the transaction processor and used to determine approval or denial of a payment transaction based thereon. In such instances, the acquiring financial institution 710 may receive an authorization response for the payment transaction even if the transaction processing server 712 is unavailable, ensuring that transactions are processed and no downtime is experienced even in instances where communication is unavailable. In such cases, the transaction processor may store transaction details for the payment transactions, which may be transmitted to the transaction processing server 712 (e.g., and from there to the associated issuing financial institutions 702) once communication is reestablished.

In some embodiments, transaction processors may be configured to include a plurality of different communication channels, which may utilize multiple communication cards and/or devices, to communicate with the transaction processing server 712 for the sending and receiving of transaction messages. For example, a transaction processor may be comprised of multiple computing devices, each having multiple communication ports that are connected to the transaction processing server 712. In such embodiments, the transaction processor may cycle through the communication channels when transmitting transaction messages to the transaction processing server 712, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 710 may identify that an authorization request involves an issuing financial institution 702 (e.g., via the bank identification number included in the transaction message) for which no value-added services are required. The transaction processor at the acquiring financial institution 710 may then transmit the authorization request directly to the transaction processor at the issuing financial institution 702 (e.g., without the authorization request passing through the transaction processing server 712), where the issuing financial institution 702 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 712 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 708, acquiring financial institution 710, etc.) for processing using this advanced network, and to quickly and efficiently receive a response regarding the ability for a consumer 704 to fund the payment transaction.

Computer System Architecture

Figure 8:
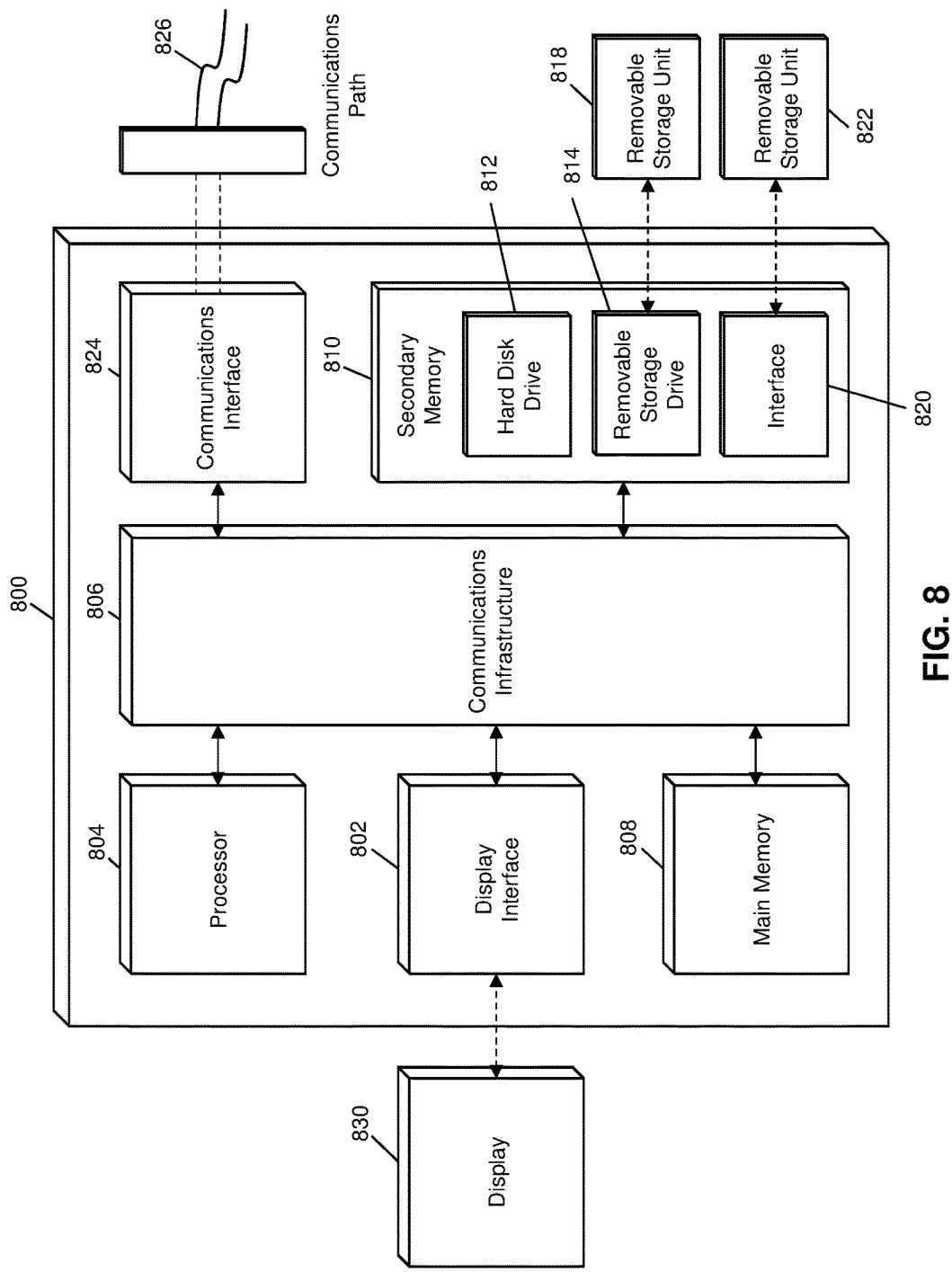
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for identifying a plurality of related computing devices related to a transaction account. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for determining attribution for a computing device, comprising:
   receiving, by a receiving device of a processing server, an attribution request from a third party entity, wherein the attribution request includes at least a specific computing device identifier and an indication of an advertisement;
   identifying, by a querying module of the processing server, a digital token number associated with the specific computing device identifier, wherein the association is based on a prior provisioning of the digital token number to a computing device associated with the specific computing device identifier;
   identifying, by the querying module of the processing server, a primary account number corresponding to the identified digital token number and one or more alternative digital token numbers also corresponding to the identified digital token number, where each of the one or more alternative digital token numbers were previously provisioned to a separate computing device unique to the one or more alternative digital token numbers and distinct from the computing device associated with the specific computing device identifier;
   identifying, by the querying module of the processing server, a transaction data entry related to an electronic transaction, wherein the transaction data entry includes transaction data and one of: the digital token number, the primary account number, and one of the one or more alternative digital token numbers; and
   electronically transmitting, by a transmitting device of the processing server, an attribution message to the third party entity, wherein the attribution message includes attribution of the indicated advertisement to the related electronic transaction.

2. The method of claim 1, wherein the attribution message further includes the transaction data.

3. The method of claim 1, wherein the attribution message further includes computing device data associated with each one of the one or more alternative digital token numbers, the computing device data corresponding to a computing device to which the associated digital token number was previously provisioned.

4. The method of claim 3, wherein the computing device data includes at least one of: make, manufacturer, model, form factor, architecture, type, and geographic location.

5. The method of claim 1, further comprising:
   storing, in a token profile database of the processing server, a plurality of token profiles, wherein each token profile includes a structured data set related to a payment token including at least a token number, a transaction account number, and a computing device identifier, wherein
   identification of a digital token number associated with the specific computing device identifier includes execution of a query on the token profile database to identify a specific token profile where the included computing device identifier corresponds to the specific computing device identifier, and
   the digital token number is the token number included in the identified specific token profile, and
   the primary account number is the transaction account number included in the identified specific token profile.

6. The method of claim 5, wherein
identifying a primary account number and one or more alternative digital token numbers includes execution of a query on the token profile database to identify one or more alternative token profiles where the included transaction account number corresponds to the primary account number, and
each of the one or more alternative digital token numbers is a digital token number included in one of the identified one or more alternative token profiles.

7. The method of claim 1, further comprising:
storing, in a transaction database of the processing server, a plurality of transaction data entries, wherein the plurality of transaction data entries includes at least the identified transaction data entry.

8. The method of claim 1, further comprising:
identifying, by a data identification module of the processing server, one or more metrics, wherein
each metric is associated with the attribution of the indicated advertisement to the related electronic transaction, and
the one or more metrics are included in the attribution message.

9. The method of claim 8, wherein the attribution request further includes exposure data associated with exposure of the indicated advertisement to the computing device.

10. The method of claim 9, wherein the one or more metrics are based on at least the exposure data and the transaction data and include at least one of: number of exposures to the indicated advertisement, length of time between exposure and the related electronic transaction, and effectiveness of exposure platform.

11. A system for determining attribution for a computing device, comprising:
a receiving device of a processing server configured to receive an attribution request from a third party entity, wherein the attribution request includes at least a specific computing device identifier and an indication of an advertisement;
a querying module of the processing server configured to
identify a digital token number associated with the specific computing device identifier, wherein the association is based on a prior provisioning of the digital token number to a computing device associated with the specific computing device identifier,
identify a primary account number corresponding to the identified digital token number and one or more alternative digital token numbers also corresponding to the identified digital token number, where each of the one or more alternative digital token numbers were previously provisioned to a separate computing device unique to the one or more alternative digital token numbers and distinct from the computing device associated with the specific computing device identifier, and
identify a transaction data entry related to an electronic transaction, wherein the transaction data entry includes transaction data and one of: the digital token number, the primary account number, and one of the one or more alternative digital token numbers; and
a transmitting device of the processing server configured to electronically transmit an attribution message to the third party entity, wherein the attribution message includes attribution of the indicated advertisement to the related electronic transaction.

12. The system of claim 11, wherein the attribution message further includes the transaction data.

13. The system of claim 11, wherein the attribution message further includes computing device data associated with each one of the one or more alternative digital token numbers, the computing device data corresponding to a computing device to which the associated digital token number was previously provisioned.

14. The system of claim 13, wherein the computing device data includes at least one of: make, manufacturer, model, form factor, architecture, type, and geographic location.

15. The system of claim 11, further comprising:
a token profile database of the processing server configured to store a plurality of token profiles, wherein each token profile includes a structured data set related to a payment token including at least a token number, a transaction account number, and a computing device identifier, wherein
identification of a digital token number associated with the specific computing device identifier includes execution of a query on the token profile database to identify a specific token profile where the included computing device identifier corresponds to the specific computing device identifier, and
the digital token number is the token number included in the identified specific token profile, and
the primary account number is the transaction account number included in the identified specific token profile.

16. The system of claim 15, wherein
identifying a primary account number and one or more alternative digital token numbers includes execution of a query on the token profile database to identify one or more alternative token profiles where the included transaction account number corresponds to the primary account number, and
each of the one or more alternative digital token numbers is a digital token number included in one of the identified one or more alternative token profiles.

17. The system of claim 11, further comprising:
a transaction database of the processing server configured to store a plurality of transaction data entries, wherein the plurality of transaction data entries includes at least the identified transaction data entry.

18. The system of claim 11, further comprising:
a data identification module of the processing server configured to identify one or more metrics, wherein
each metric is associated with the attribution of the indicated advertisement to the related electronic transaction, and
the one or more metrics are included in the attribution message.

19. The system of claim 18, wherein the attribution request further includes exposure data associated with exposure of the indicated advertisement to the computing device.

20. The system of claim 19, wherein the one or more metrics are based on at least the exposure data and the transaction data and include at least one of: number of exposures to the indicated advertisement, length of time between exposure and the related electronic transaction, and effectiveness of exposure platform.

* * * * *